United States Patent
Ivan et al.

(10) Patent No.: US 12,462,549 B2
(45) Date of Patent: Nov. 4, 2025

(54) METHOD FOR DETERMINING THE ENCODER ARCHITECTURE OF A NEURAL NETWORK

(71) Applicant: Continental Autonomous Mobility Germany GmbH, Ingolstadt (DE)

(72) Inventors: David Ivan, Balatonszemes (HU); Regina Deak-Meszlenyi, Budapest (HU); Csaba Nemes, Dunakeszi (HU)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 256 days.

(21) Appl. No.: 18/262,984

(22) PCT Filed: Jan. 24, 2022

(86) PCT No.: PCT/EP2022/051427
§ 371 (c)(1),
(2) Date: Jul. 26, 2023

(87) PCT Pub. No.: WO2022/161891
PCT Pub. Date: Aug. 4, 2022

(65) Prior Publication Data
US 2024/0127585 A1     Apr. 18, 2024

(30) Foreign Application Priority Data
Jan. 26, 2021 (EP) .................................. 21153462

(51) Int. Cl.
*G06V 10/82* (2022.01)
*G06N 3/0455* (2023.01)

(52) U.S. Cl.
CPC ........... *G06V 10/82* (2022.01); *G06N 3/0455* (2023.01)

(58) Field of Classification Search
CPC ........ G06V 10/82; G06V 10/87; G06V 20/58; G06N 3/0455; G06N 3/045; G06N 3/08; G06F 18/24137; G06F 18/285
See application file for complete search history.

(56) References Cited

U.S. PATENT DOCUMENTS 11,189,049 B1 *  11/2021  Chakravarty ............. G06T 7/73
2018/0247201 A1 *  8/2018  Liu ........................... G06T 1/00
(Continued)

FOREIGN PATENT DOCUMENTS

CN    109858372 A    6/2019
CN    110705695 A    1/2020
(Continued)

OTHER PUBLICATIONS

Eric Crawford et al., "Spatially Invariant Unsupervised Object Detection with Convolutional Neural Networks," Jul. 17, 2019, AAAI Technical Track: Machine Learning, vol. 33 No. 01,AAAI-19, IAAI-19, EAAI-20, pp. 3412-3418.*
(Continued)

*Primary Examiner* — Omar S Ismail
(74) *Attorney, Agent, or Firm* — Buchanan Ingersoll & Rooney PC

(57) ABSTRACT

A method for determining an encoder architecture of a convolutional neural network configured to process image processing tasks. For each image processing task), characteristic scale distribution is calculated based on training data. Encoder architecture candidates are generated, each including a shared encoder layer providing computational operations for image processing tasks and branches which span over encoder layers providing at least partly different computational operations for the image processing tasks. Each branch is associated with a certain image processing task. Receptive encoder layer field sizes and assessment measures are calculated, each assessment measure referring to a (Continued)

combination of a certain encoder architecture and a certain image processing task, and including information regarding matching quality of characteristic scale distribution associated with the assessment measure to the receptive field sizes of the encoder layers. The assessment measures are compared and a comparison result established. An encoder architecture is selected based on the comparison result.

16 Claims, 7 Drawing Sheets

(56) References Cited

U.S. PATENT DOCUMENTS

| | | | |
|---|---|---|---|
| 2019/0354818 A1* | 11/2019 | Reisswig | G06N 3/04 |
| 2019/0370648 A1 | 12/2019 | Zoph et al. | |
| 2020/0193269 A1* | 6/2020 | Park | G06V 10/82 |
| 2021/0056691 A1* | 2/2021 | Gernand | G06N 3/08 |
| 2021/0271870 A1* | 9/2021 | Ni | G06V 10/82 |
| 2021/0357674 A1* | 11/2021 | Ogawa | G06V 20/62 |
| 2021/0358177 A1* | 11/2021 | Park | G06N 3/045 |

FOREIGN PATENT DOCUMENTS

| | | |
|---|---|---|
| CN | 111209383 A | 5/2020 |
| CN | 111667728 A | 9/2020 |
| CN | 111819580 A | 10/2020 |
| JP | 2021111388 A | 8/2021 |

OTHER PUBLICATIONS

Zhongling Huang et al., "Transfer Learning with Deep Convolutional Neural Network for SAR Target Classification with Limited Labeled Data," Aug. 31, 2017, Remote Sens. 2017, 9(9), 907, pp. 1-17.*

Wenjie Luo et al., "Understanding the Effective Receptive Field in Deep Convolutional Neural Networks, "Nov. 13, 2024,30th Conference on Neural Information Processing Systems (NIPS 2016), Barcelona, Spain, pp. 1-7.*

Simon Vandenhende et al., "Branched Multi-Task Networks: Deciding What Layers to Share," Aug. 13, 2020, arXiv:1904.02920, pp. 1-14.*

Trevor Standley et al., "Which Tasks Should Be Learned Together in Multi-task Learning?," Jul. 13, 2020, ICML'20: Proceedings of the 37th International Conference on Machine Learning, Article No. 846, pp. 1-8.*

Asifullah Khan et al., A survey of the recent architectures of deep convolutional neural networks,Apr. 21, 2020, Artificial Intelligence Review (2020) 53, pp. 5455-5490.*

Syed Shakib Sarwar et al., "Incremental Learning in Deep Convolutional Neural Networks Using Partial Network Sharing, "Jan. 8, 2020, IEEE Access, vol. 8, 2020, pp. 4615-4623.*

Timothy Hospedales et al., "Meta-Learning in Neural Networks: A Survey," Aug. 4, 2022, IEEE Transactions on Pattern Analysis and Machine Intelligence, vol. 44, No. 9, Sep. 2022, pp. 5149-5160.*

Liang-Chieh Chen et al., "Searching for Efficient Multi-Scale Architectures for Dense Image Prediction, "Dec. 3, 2018, NIPS'18: Proceedings of the 32nd International Conference on Neural Information Processing Systems, pp. 1-7.*

Notice of Reasons for Refusal drafted Mar. 11, 2024 for the counterpart Japanese Patent Application No. 2023-537026 and machine translation of same.

European Examination Report dated Apr. 23, 2024 for the priority European Patent Application No. 21 153 462.3.

European Search Report dated Jul. 9, 2021 for the counterpart European Patent Application No. 21153462.3.

The International Search Report and the Written Opinion of the International Searching Authority mailed on May 27, 2022 for the priority PCT Application No. PCT/EP2022/051427.

Thomas Elsken et al: "Neural Architecture Search: A Survey", CORR (ARXIV), vol. 1808.05377, No. v3, Apr. 26, 2019 (Apr. 26, 2019), pp. 1-21, XP055710476, Journal of Machine Learning Research, .vol. 20, pp. 1-21, Mar. 19, 2019.

Timothy Hospedales et al: "Meta-Learning in Neural Networks: A Survey", arxiv.org, Cornell University Library, 201 Olin Library Cornell University Ithaca, NY 14853, Nov. 7, 2020 (Nov. 7, 2020), XP081797264.

Joaquin Vanschoren: "Meta-Learning: A Survey", arxiv.org, Cornell University Library, 201 Olin Library Cornell University Ithaca, NY 14853, Oct. 8, 2018 (Oct. 8, 2018), XP081058788.

Liang-Chieh Chen et al.: "Searching for Efficient Multi-Scale Architectures for Dense Image Prediction", arxiv.org, Cornell University Library, 201 Olin Library Cornell University Ithaca, NY 14853, Sep. 12, 2018 (Sep. 12, 2018), XP081190147; 32nd Conf. on Neural Information Processing Systems (NIPS 2018), Montreal, Canada.

Nikolas Adaloglou: "Understanding the receptive field of deep convolutional networks," AI Sumner, AI, Jul. 2, 2020, XP055920333, https//theaisummer.com/receptive-field.

Wenjie Luo et al : "Understanding the Effective Receptive Field in Deep Convolutional Neural Networks", arxiv.org, Cornell University Library, 201 Olin Library Cornell University Ithaca, NY 14853, Jan. 16, 2017 (Jan. 16, 2017), XP080749208; 29th Conf. on Neural Information Processing Systems (NIPS 2016), Barcelona, Spain.

Simon Vandenhende et al: "Branched Multi-Task Networks: Deciding what Layers to Share", arXiv:1904.02920 [cs.CV], Nov. 2, 2019.

Trevor Standley et al: "Which Tasks Should Be Learned Together in Multi-task Learning?", arXiv:1905.07553 [cs.CV], May 21, 2019.

Office Action (The First Office Action) issued Jul. 28, 2025, by the State Intellectual Property Office of People's Republic of China in corresponding Chinese Patent Application No. 202280008670.0 and an English translation of the Office Action. (18 pages).

* cited by examiner

|  |  | 50th prc | 60th prc | 80th prc | 99th prc |
|---|---|---|---|---|---|
| Task t1 | Characteristic scale | 110 | 150 | 250 | 500 |
| Task t2 | Characteristic scale | 160 | 270 | 530 | 1100 |

Fig. 5

| Architecture A | Block Width | 40 | 40 | 56 | 64 | 64 |  |  |  |
|---|---|---|---|---|---|---|---|---|---|
|  | Receptive Field | 90 | 122 | 186 | 314 | 570 |  |  |  |
| Architecture B | Block Width | 32 | 32 | 40 | 64 | 64 | 64 |  |  |
|  | Receptive Field | 90 | 122 | 186 | 250 | 378 | 634 |  |  |
| Architecture C | Block Width | 32 | 32 | 32 | 56 | 56 | 64 | 64 |  |
|  | Receptive Field | 90 | 122 | 186 | 250 | 378 | 506 | 762 |  |
| Architecture D | Block Width | 32 | 32 | 32 | 56 | 56 | 56 | 64 | 64 |
|  | Receptive Field | 90 | 122 | 186 | 250 | 378 | 506 | 762 | 1018 |
| Architecture E | Block Width | 32 | 32 | 32 | 40 | 40 | 56 | 56 | 56 | 56 |
|  | Receptive Field | 90 | 122 | 186 | 250 | 378 | 506 | 762 | 1018 | 1530 |

Fig. 6

| Task t1 Characteristic scale | Architecture A | 40 | 40 | 56 | 64 | 64 | |
|---|---|---|---|---|---|---|---|
| | Receptive Field | 90 | 122 | 186 | 314 | 570 | |
| 50th prc | 110 | - | 12 | - | - | - | |
| 60th prc | 150 | - | - | 36 | - | - | |
| 80th prc | 250 | - | - | - | 64 | - | |
| 99th prc | 500 | - | - | - | - | 70 | Sum Loss |
| | | | | | | | 182 |

Fig. 7

| Task t2 Characteristic scale | Architecture A | 40 | 40 | 56 | 64 | 64 | |
|---|---|---|---|---|---|---|---|
| | Receptive Field | 90 | 122 | 186 | 314 | 570 | |
| 50th prc | 160 | - | 36 | - | - | - | |
| 60th prc | 270 | - | - | 84 | - | - | |
| 80th prc | 530 | - | - | - | 216 | - | |
| 99th prc | 1100 | - | - | - | - | 530 | Sum Loss |
| | | | | | | | 868 |

Fig. 8

| Task t1 Characteristic scale | Architecture C | 32 | 32 | 32 | 56 | 56 | 64 | 64 | |
|---|---|---|---|---|---|---|---|---|---|
| | Receptive Field | 90 | 122 | 186 | 250 | 378 | 506 | 762 | |
| 50th prc | 110 | - | 12 | 76 | - | - | - | - | |
| 60th prc | 150 | - | - | - | 100 | 228 | - | - | |
| 80th prc | 250 | - | - | - | - | - | 256 | - | |
| 99th prc | 500 | - | - | - | - | - | - | 262 | Sum Loss |
| | | | | | | | | | 630 |
| | | | | | | | | | or |
| | | | | | | | | | 694 |
| | | | | | | | | | or |
| | | | | | | | | | 758 |
| | | | | | | | | | or |
| | | | | | | | | | 822 |

Fig. 9

| Task t2 Characteristic scale | Architecture C | 32 | 32 | 32 | 56 | 56 | 64 | 64 | |
|---|---|---|---|---|---|---|---|---|---|
| | Receptive Field | 90 | 122 | 186 | 250 | 378 | 506 | 762 | |
| 50th prc | 160 | - | 38 | 26 | - | - | - | - | |
| 60th prc | 270 | - | - | - | 20 | 108 | - | - | |
| 80th prc | 530 | - | - | - | - | - | 24 | - | |
| 99th prc | 1100 | - | - | - | - | - | - | 338 | Sum Loss |
| | | | | | | | | | 420 |
| | | | | | | | | | or |
| | | | | | | | | | 408 |
| | | | | | | | | | or |
| | | | | | | | | | 508 |
| | | | | | | | | | or |
| | | | | | | | | | 496 |

Fig. 10

METHOD FOR DETERMINING THE ENCODER ARCHITECTURE OF A NEURAL NETWORK

CROSS REFERENCE TO RELATED APPLICATIONS

The present application is a National Stage Application under 35 U.S.C. § 371 of International Patent Application No. PCT/EP2022/051427 filed on Jan. 24 2022, and claims priority from European Patent Application No. 21153462.3 filed on Jan. 26, 2021, in the European Patent Office, the disclosures of which are herein incorporated by reference in their entireties.

TECHNICAL FIELD

The present invention relates generally to the field of convolutional neural networks. More specifically, the invention relates to a method for determining the architecture of a shared encoder of a convolutional neural network which is configured to process multiple different image processing tasks.

BACKGROUND

Convolutional neural networks are very powerful in solving tasks based on pattern recognition (e.g. pedestrian detection, lane detection, sign recognition, etc.). Instead of implementing a separate network for each task, using a shared network, specifically a share encoder for multiple tasks, has several advantages with respect to performance, computations and/or memory.

However, it is not a trivial task to determine an encoder architecture of a shared encoder which can process multiple tasks efficiently.

SUMMARY

It is an objective of the embodiments of the present disclosure to provide a method for determining the architecture or structure of an encoder of a convolutional neural network configured to process multiple different image processing tasks which provides the encoder structure with reduced computational effort and, in addition, the encoder architecture being resource-efficient and providing a high computational efficiency.

The objective is solved by the features of the independent claims. Example embodiments are given in the dependent claims. If not explicitly indicated otherwise, embodiments of the present disclosure can be freely combined with each other.

According to an aspect, the present disclosure refers to a method for determining the architecture of an encoder, specifically a shared encoder, of a convolutional neural network, the neural network being configured to process multiple different image processing tasks. More in detail, the neural network may be an artificial neural network including a shared encoder, the encoder architecture being tailored for processing multiple image processing tasks. After determining the encoder architecture, the neural network is trained in order to enable the neural network to process the image processing tasks. The method may be at least partially a computer-implemented method. The method includes the following steps:

First, for each image processing task, characteristic scale distribution based on training data is calculated. The characteristic scale distribution is indicative for the size of the image section to be provided to a task-specific decoder in order to enable the task-specific decoder to provide task-specific information.

In addition, multiple encoder architecture candidates are generated. Each encoder architecture (also referred to as encoder structure) of the encoder architecture candidates comprises at least one shared encoder layer which provides computational operations for multiple image processing tasks. In addition, each encoder architecture comprises multiple branches which span over one or more encoder layers. Each branch is associated with a certain image processing task and provides at least partly task-specific computational operations for the image processing task. More in detail, task-specific decoders which provide computations tailored to the respective image processing task receive feature maps of one or more encoder layers of a branch which is associated with the respective image processing task.

Furthermore, receptive field sizes of the encoder layers of the multiple encoder architectures are calculated. A receptive field size associated with a certain encoder layer is indicative for the image portion which influences the output of the encoder layer. The receptive field size may be calculated by investigating the size of an image portion of an input image which has an influence on the features of the feature map and therefore the output of a certain encoder layer. The receptive field sizes of the encoder layers may, for example, be calculated based on the convolutional properties, for example kernel size and stride factor.

Afterwards, multiple assessment measures are calculated. The assessment measure may be an indicator for the quality of matching of an encoder architecture candidate to a certain image processing task. More in detail, the assessment measure may indicate the matching of receptive field sizes of the encoder layers of an encoder architecture candidate to the characteristic scale distribution of a certain image processing task. Each assessment measure refers to a combination of a certain encoder architecture of the multiple encoder architectures and a certain image processing task. Each assessment measure includes information regarding the quality of matching of characteristic scale distribution of the image processing task associated with the assessment measure to the receptive field sizes of the encoder layers of the encoder architecture associated with the assessment measure. So, in other words, the assessment measure provides information how good the receptive field sizes of the encoder layers of a branch associated with an image processing task fit to the determined characteristic scale distribution of the image processing task.

As an example, the assessment measure associated with a combination of encoder architecture and an image processing task may be calculated by summing up the squares of the differences of the receptive field sizes of the encoder layers and the percentiles of characteristic scale distribution required by the task-specific decoder.

After determining the assessment measures, the calculated assessment measures are compared and a comparison result is established. Specifically, the comparison result leads to an encoder architecture with receptive field sizes of the encoder layers that fit best to the characteristic scale distribution of a certain image processing task.

Finally, an encoder architecture is selected based on the comparison result.

The method is advantageous because a shared encoder can be developed which provides encoding operations for multiple image processing tasks with reduced computational effort and in a resource-efficient way, specifically in a limited hardware environment.

The present disclosure is useful in proposing an improved multi-task neural architecture for a given set of image processing tasks, respectively, task-specific decoders, by considering optimal receptive fields based on task specific properties. In contrast to other architecture search methods, where either the full set of possible architectures have to be held in memory and trained in parallel, or all architectures have to be trained to some extent, the proposed method provides an architecture based on static properties that can be calculated without neural network training. As the number of possible architectures grows exponentially with the number of tasks that has to be solved by the multi-task network, the proposed architecture search method saves tremendous amount of time, making principled architecture design feasible for embedded hardware.

The proposed method may be used for determining encoder architectures for image processing tasks of images provided by a front camera of a vehicle. In automotive applications, multiple tasks have to be solved simultaneously. Therefore, the present disclosure may refer to 2D convolutional neural networks.

Beside the most common deep learning tasks like object detection, lane detection and semantic segmentation, the proposed method can be extended to other 2D image processing tasks, like mono-camera based depth estimation, surface normal estimation, keypoint detection for, e.g., human pose estimation etc.

Beside further 2D image processing tasks, aspects of the present disclosure can be extended to both 1D, 3D or even higher dimensional convolutional neural networks:
  3D convolutional networks have applications in radar or lidar point cloud processing, or they can be applied for video feed from a camera;
  1D convolutional networks are useful in time-series processing, e.g., for processing other sensor measurements, like temperature, acceleration etc.;
  4D convolutional networks can be applied to process point cloud sequences from radar or lidar sensors.

According to an example embodiment, the image processing tasks include one or more of the following list of tasks: object detection, lane detection, semantic segmentation.

According to an example embodiment, the convolutional neural network, specifically the encoder is configured and/or specifically tailored to be processed on an embedded hardware, specifically an embedded computer module or system on a chip (SoC) included in a vehicle. Such embedded hardware typically comprises limited computational resources. As such, the convolutional neural network, specifically the encoder has to be designed for such limited computational resources in order to provide image processing results in a given runtime limit, respectively, real-time or quasi-real-time. The runtime limit may be in the range of 10 ms to 50 ms, specifically 10 ms, 15 ms, 20 ms, 25 ms, 30 ms, 35 ms, 40 ms, 45 ms or 50 ms.

According to an embodiment, for each image processing task, one or more percentiles are determined, the values of the one or more percentiles depending on the interface of the task-specific decoder. For example, the interface of the task-specific decoder may include one or more input connections. Depending on the interface of the task-specific decoder, the values of the one or more percentiles are chosen such that the decoder is capable to receive required information (e.g. information of a certain image section size) for task-specific decoding operation.

According to an embodiment, the number of determined percentiles is chosen according to the number of input connections required by the task-specific decoder. For example, if the task-specific decoder only has a single input connection, a maximum percentile value may be chosen, e.g. 99% percentile. If the task-specific decoder has multiple input connections (e.g. 2, 3 or more), multiple different percentile values (e.g. 2, 3 or more) may be chosen in order to provide information of different image section sizes to the decoder.

According to an embodiment, the values of the percentiles are distributed across a percentile range defined by a minimum and a maximum percentile value. For example, the maximum percentile value may be 99% percentile and the minimum value may be 50% or lower. If the decoder provides only two input connections, the minimum percentile value (e.g. 50%) and the maximum percentile value (e.g. 99%) may be chosen. If the decoder provides three input connections, the minimum percentile value (e.g. 50%), a mean percentile value (e.g. 75%) and the maximum percentile value (e.g. 99%) may be chosen. If the decoder provides four input connections, the minimum percentile value (e.g. 50%), two mean percentile values (e.g. 66% and 82%) and the maximum percentile value (e.g. 99%) may be chosen. Thereby it is possible to provide different image section sizes to the task-specific decoder depending on the decoder input interface.

According to an embodiment, the values of the percentiles are equally distributed across the percentile range which is defined by a minimum percentile value and a maximum percentile value. Thereby it is possible to provide staggered information of different image section sizes to the task-specific decoder.

According to an embodiment, at least some of the encoder layers of a task-specific branch of the encoder comprise a feature map with a resolution which matches to the feature resolution of an input connection of task-specific decoder. Thereby it is possible to couple the output provided by a certain encoder layer to a resolution-appropriate input connection of task-specific decoder.

According to an embodiment, the step of determining multiple encoder architecture candidates comprises selecting certain building blocks, which are adapted for an encoder of a neural network, out of a set of building blocks and connecting the selected building blocks in order to obtain an encoder architecture. The set of building blocks may be predefined depending on the specific computational hardware on which the neural network should run. More specifically, the set of building blocks may be predefined by considering the computational resources which are provided by the embedded computational hardware. For some embedded hardware these building blocks are extremely simple, containing only simple convolutional layers, pooling operations and activations. For other embedded hardware, these building blocks can be ResNet or DarkNet blocks, or even cells from architecture search methods like DARTS. By stacking these blocks, it is possible to create deeper encoders and each block has a specific width (or channel number), with which the width of the network can be tuned.

According to an embodiment, the encoder architectures of the encoder architecture candidates are generated (e.g. automatically or semi-automatically) by defining a runtime limit and the encoder architectures are created such that, at a given hardware, the encoder architectures provide computational results in a runtime range of 90% to 100% of the runtime limit. For example, depending on the number of encoder layers (i.e. convolutional layers), the width of the layer (i.e. channel number) may be chosen such that the given runtime limit is exploited.

According to an embodiment, the step of calculating multiple assessment measures includes comparing the receptive field size of an encoder layer which matches with the resolution of task-specific decoder with a determined percentile value and determining the distance between the receptive field size and the percentile value. So, if receptive field size has a value of X and percentile value is Y, the calculation of assessment measures comprises calculating the difference between X and Y.

According to an embodiment, specifically if the task-specific decoder includes multiple input connections, the step of calculating multiple assessment measures includes comparing multiple receptive field sizes of encoder layers which match with the resolution of task-specific decoder with multiple determined percentile values and determining the sum of distances between the receptive field sizes and the percentile values. Thereby, the overall distance between multiple receptive field size/percentile value pairs can be considered for assessing the encoder architectures.

According to an embodiment, the step of calculating multiple assessment measures uses a loss function with a least absolute deviations distance measure, i.e., L1 distance measure or a cosine distance measure.

According to an embodiment, the step of calculating multiple assessment measures uses a loss function with a penalty term, the penalty term being adapted to increase the assessment measure with decreasing number of layers shared between multiple image processing tasks of an encoder architecture. Thereby encoder architectures with a higher number of shared layers are privileged over encoder architectures with lower number of shared layers because a higher number of shared layers increases the computational efficiency.

According to an embodiment, the step of comparing the calculated assessment measures and establishing a comparison result includes determining an encoder architecture for each image processing task which has the lowest assessment measure. Thereby an improved encoder architecture for handling multiple image processing tasks can be determined based on image processing task properties and encoder/decoder properties of neural network architectures which are available without training the neural network architectures. Thereby, an improved encoder architecture can be found with reduced computational effort.

According to an embodiment, the step of selecting an encoder architecture based on the comparison result includes selecting, for each image processing task, the encoder architecture which has the lowest assessment measure. For example, the selected encoder architectures are combined by sharing encoder layers with same properties, e.g., encoder layer width and branching the encoder in different encoder branches if the encoder layers have different encoder layer properties.

According to a further aspect, the present disclosure relates to a computer program product for determining the architecture of an encoder. The computer program product comprises a computer readable storage medium having program instructions embodied therewith, the program instructions being executable by a processor to cause the processor to execute a method according to anyone of the preceding claims.

The term "vehicle" as used in the present disclosure may refer to a car, truck, bus, train or any other crafts.

The term "characteristic scale" as used in the present disclosure may refer to the number of pixels or image section to be received by a task-specific decoder in order to recognize task-specific details in the image. As such, "characteristic scale" strongly depends on the specific image processing task.

The term "receptive field" as used in the present disclosure may refer to a collection of pixels of an image provided to the input of the encoder, the collection of pixels affecting a particular neuron (also referred to as feature) in the feature map of the encoder layer. So, in other words, the receptive field refers to an image portion which has an influence on the features of the feature map and therefore the output of a certain encoder layer.

The term "receptive field size" as used in the present disclosure may refer to the size of a number of pixels or an image section received by a certain encoder layer. The receptive field may be a rectangle, wherein the length and height of the rectangle is the receptive field size. Due to cascading of encoder layers, the receptive field size of first encoder layer is lower than the receptive field size of a hidden encoder layer.

The term "task-specific decoder" as used in the present disclosure may refer to a decoder which is configured to provide decoding operations for a single image processing task, i.e., each image processing task comprises its own task-specific decoder.

The term "feature map" as used in the present disclosure may refer to a set of features provided by a certain encoder layer which can be transmitted to the task-specific decoder. The feature map may include a certain resolution. The resolution of the feature map has to be adapted to the resolution required by the task-specific decoder in order to enable the task-specific decoder to process the feature map.

The term "percentile" as used in the present disclosure may refer to a score at or below which a given percentage of scores in its frequency distribution fall.

The term "image processing task" may refer to any task applied to images or videos provided by a camera. In addition, the term "image processing task" may also refer to tasks applied to information provided by other sensors like radar, lidar.

The term "essentially" or "approximately" as used in the invention means deviations from the exact value by +/−10%, preferably by +/−5% and/or deviations in the form of changes that are insignificant for the function and/or for the traffic laws.

BRIEF DESCRIPTION OF THE DRAWINGS

The various aspects of the invention, including its particular features and advantages, will be readily understood from the following detailed description and the accompanying drawings, in which:

FIG. 5 shows a table with values of 50$^{th}$, 60$^{th}$, 80$^{th}$ and 99$^{th}$ percentiles of characteristic scale distributions of a first and a second task;

FIG. 6 illustrates multiple encoder architectures with different length, encoder layer width and the receptive fields of the encoder layers;

FIG. 7 illustrates the calculation of an assessment measure indicating the matching quality of architecture A according to FIG. 6 to image processing task t1 according to FIG. 5;

FIG. 8 illustrates the calculation of an assessment measure indicating the matching quality of architecture A according to FIG. 6 to image processing task t2 according to FIG. 5;

FIG. 9 illustrates the calculation of an assessment measure indicating the matching quality of architecture C according to FIG. 6 to image processing task t1 according to FIG. 5;

FIG. 10 illustrates the calculation of an assessment measure indicating the matching quality of architecture C according to FIG. 6 to image processing task t2 according to FIG. 5;

Figure 1:
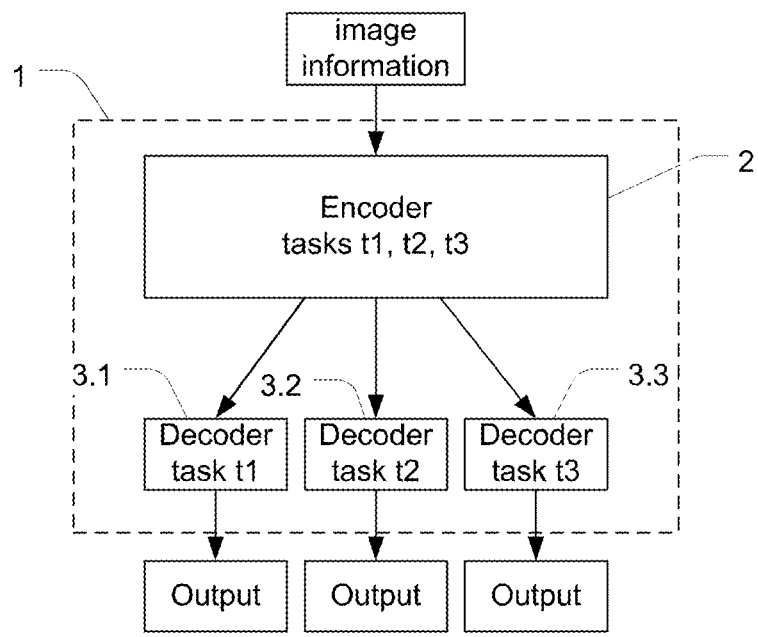
FIG. 1 shows a schematic diagram of a neural network including a shared encoder and multiple task-specific decoders.

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

DETAILED DESCRIPTION

The features of the present invention disclosed in the specification, the claims, examples and/or the figures may both separately and in any combination thereof be material for realizing the invention in various forms thereof.

FIG. 1 shows a schematic block diagram of a neural network 1. The neural network 1 includes an encoder 2. The encoder 2 is configured to process multiple image processing tasks, in the shown embodiment, image processing tasks t1, t2, t3. The encoder 2 provides information to multiple task-specific decoders 3.1, 3.2, 3.3. Each task-specific decoder 3.1, 3.2, 3.3 provides output information associated with a certain image processing task t1, t2, t3.

Figure 2:
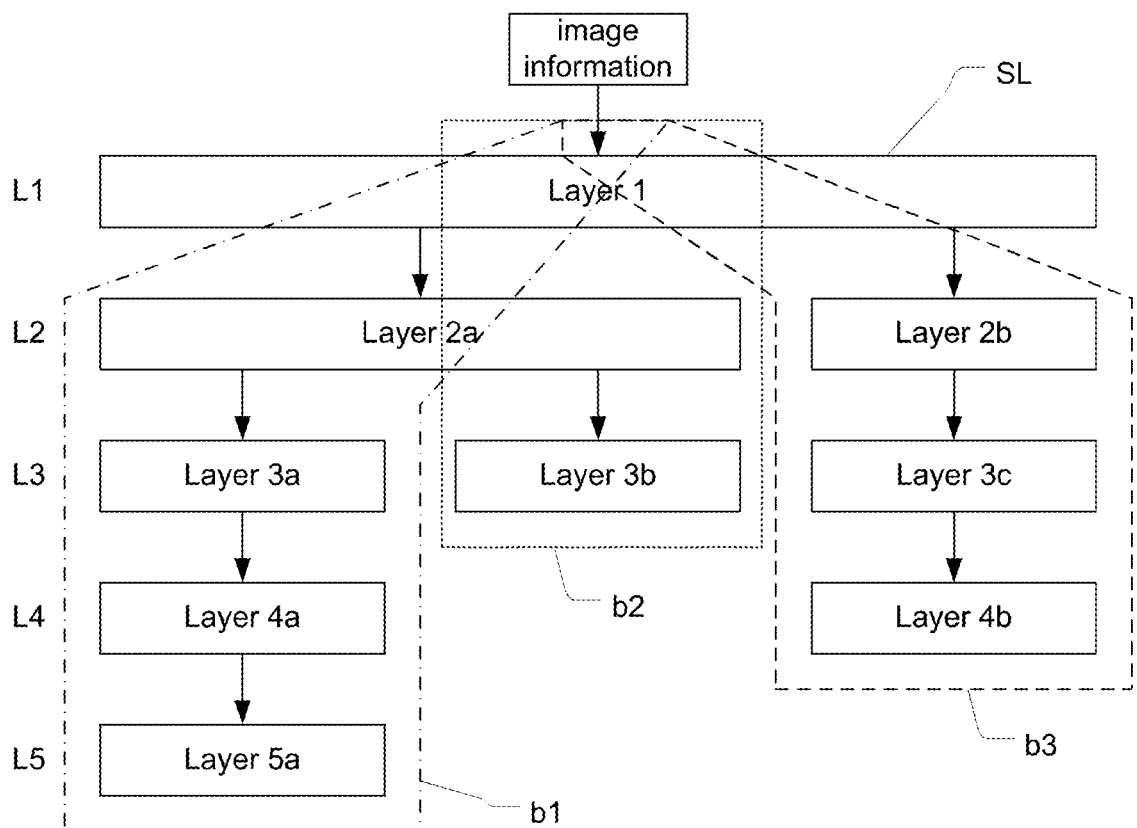
FIG. 2 schematically illustrates an example structure of a shared encoder which includes a shared layer and multiple branches for performing task-specific computational operations.

FIG. 2 shows a schematic block diagram of an example encoder architecture of encoder 2. The encoder 2 includes multiple layers L1-L5. In the shown embodiment, layer L1 is a shared layer which provides computational operations for all image processing tasks t1, t2, t3. Starting from the shared layer L1, the encoder 2 includes multiple branches b1, b2, b3. Each branch b1, b2, b3 is associated with a certain image processing task t1, t2, t3. More in detail, the encoder architecture provides in each branch functional blocks which are specifically configured for the respective image processing task t1, t2, t3. Therefore, further layers L2 to L5 at least partially provide different computational operations for the image processing tasks t1, t2, t3 in order to provide task-specific computational results.

As shown in FIG. 2, the functional blocks of one layer can be shared between a subgroup of tasks. For example, in layer L2 branches b1 and b2 use the same functional blocks, whereas branch b3 uses a different functional block in layer 2.

In addition, the branches may include different length, i.e., the branches may span over a different number of layers.

In the following, an example embodiment of a method for determining an encoder architecture is provided which includes an optimized branching in order to provide improved computational resources for handling multiple image processing tasks t1, t2, t3.

Figure 3:
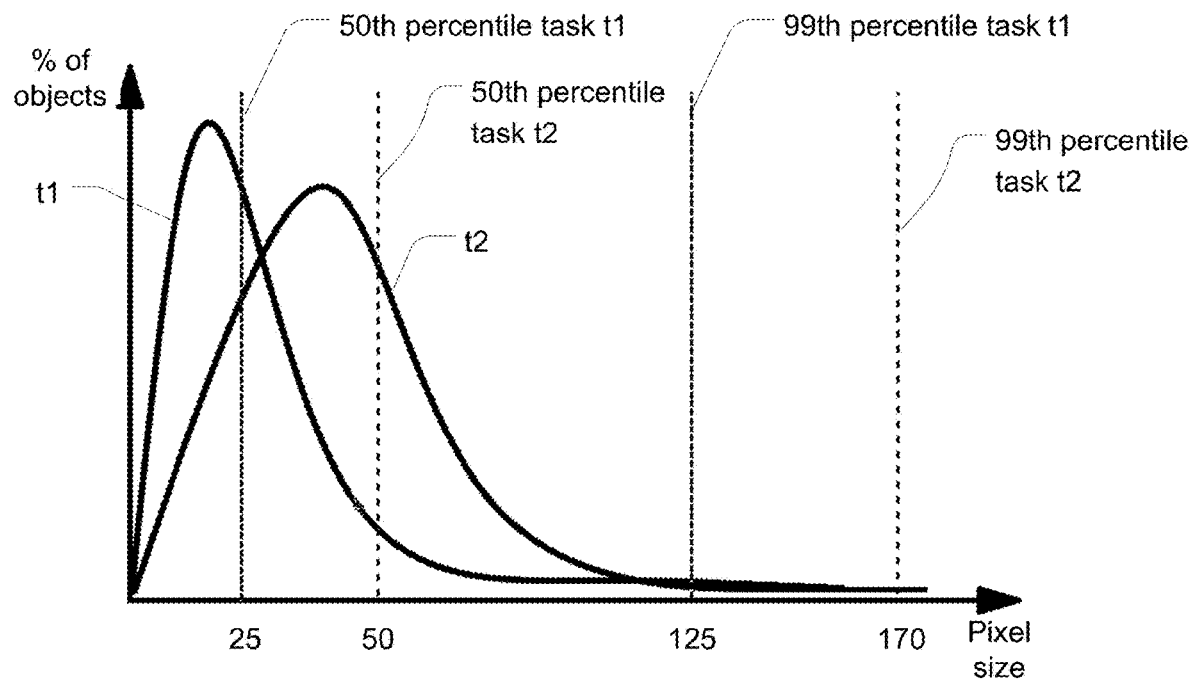
FIG. 3 schematically illustrates characteristic scale distributions of a first and a second task and their $50^{th}$ and $99^{th}$ percentiles.

FIG. 3 shows the characteristic scale distributions of two different tasks t1, t2. The characteristic scale distributions illustrate size distribution of objects to be detected in a certain image processing task t1, t2. As such, even when considering the same input image information, the characteristic scale distributions of tasks can differ significantly.

The characteristic scale distributions of tasks t1, t2 comprise a significant overlap, i.e., the object sizes required by image processing tasks t1, t2 and therefore required by the task-specific decoders are similar, i.e., encoders for tasks t1, t2 can share multiple layers.

Figure 4:
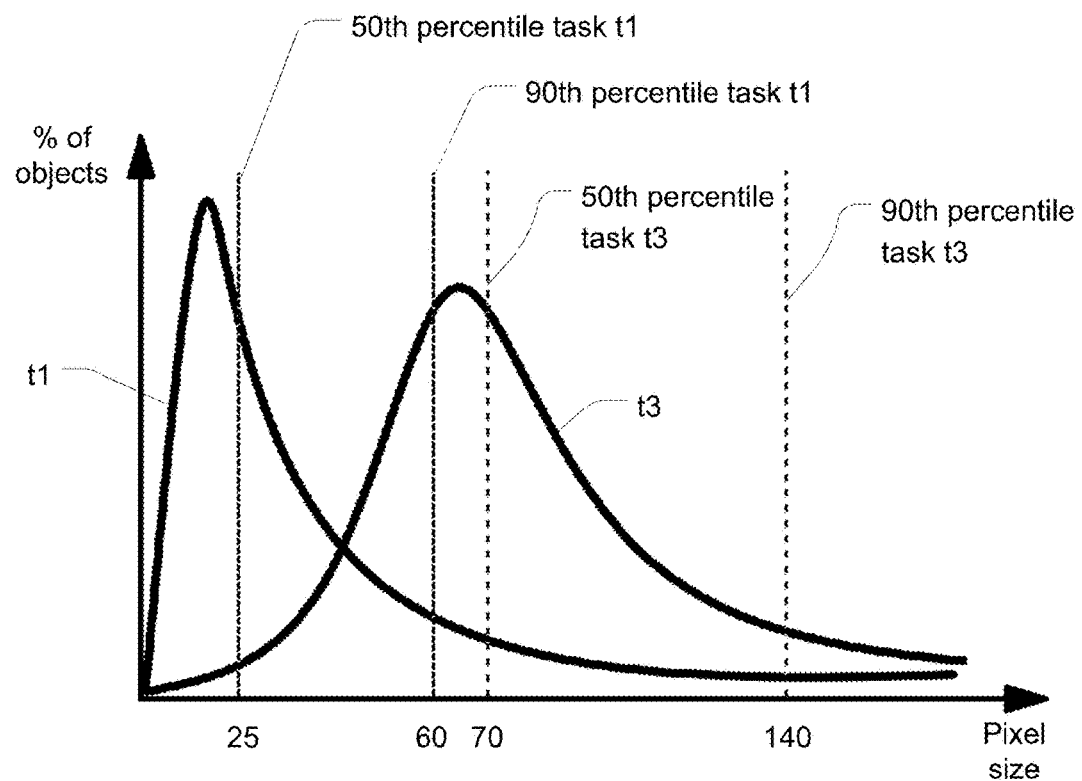
FIG. 4 schematically illustrates characteristic scale distributions of a first and a third task and their $50^{th}$ and $90^{th}$ percentiles.

In contrary thereto, the characteristic scale distributions of tasks t1, t3 shown in FIG. 4 comprise a lower overlap, i.e., the object sizes required by image processing tasks t1, t3 and therefore required by the task-specific decoders are quite different. Thus, the encoders for tasks t1, t3 can share a lower number of layers compared to the example of FIG. 3, i.e., earlier branching is necessary.

In order to determine improved encoder architecture, each image processing task is analysed separately and in order to determine characteristic scale distribution of each image processing task.

In the following, different algorithms for determining characteristic scale distributions for some image processing tasks common in driving assistance systems are described:

A first image processing task may be object detection. Object detection is a deep learning task that is crucial for assistance functions like emergency break assist (detection of traffic participants), sign recognition and traffic light recognition. Object detection decoders usually receive input from multiple different encoder layers. The different encoder layers have increasing receptive field size.

For determining the characteristic scale distribution for a given object detection task, the distribution of box sizes in training data covering the respective objects is determined. In an aspect, the encoder's receptive fields should be adapted to the box size distribution so that the receptive field sizes cover the median of characteristic scale distribution as well as a reasonable maximum size like the 99th percentile of the characteristic scale distribution. The training data for object detection purposes may be chosen such that items relevant for object detection are included in different sizes and/or from different perspectives in order to simulate real automotive detection scenarios.

It is worth mentioning that for different driving functions, the distributions of box sizes differ significantly. For example, for a specific camera, vehicle and pedestrian box sizes are in general larger than traffic sign or traffic light boxes, so their distribution's median and 99th percentile are significantly different.

A second image processing task may be lane detection. Lane and road edge detection is crucial for lane departure warning and lane keep assist systems. Task-specific decoders configured for handling lane detection tasks have two large categories, point-based solutions and line/anchor-based solutions. The characteristic scale distribution for the two categories differs substantially.

For point-based methods, the characteristic scale can be determined by the distance between two keypoints: the distribution of this distance can be calculated based on the training dataset. For line- or anchor-based solutions, the characteristic scale should be determined based on the full lane length: the distribution can be determined based on the training dataset in this case as well. For task-specific decoders that are connected to only one encoder layer, the receptive field size should be matched to the 99th percentile of the distribution of characteristic scale. For task-specific decoders that connect to multiple encoder layers, the receptive field sizes of encoder layers should be matched to the median of characteristic scale distribution as well as a reasonable maximum size like the 99th percentile of the characteristic scale distribution.

The training data for lane detection purposes may be chosen such that lane and/or road boundaries (lane markings, curbs, road edges etc.) are included in different sizes and/or from different perspectives in order to simulate real automotive detection scenarios.

A third image processing task may be semantic segmentation task. Semantic segmentation is, for example, used for free space estimation and low speed maneuvering functions like parking assistant functions. In semantic segmentation, each pixel of an image is classified to classes like road, vehicles, pedestrians, vegetation and so on. To determine the characteristic scale for semantic segmentation, the distribution of object or background mask sizes can be determined based on training data. As semantic segmentation contains large classes like "road", "buildings" and "sky," the largest receptive field sizes may cover the whole image.

The training data for semantic segmentation purposes may be chosen such that items relevant for semantic segmentation as mentioned above are included in different sizes and/or from different perspectives in order to simulate real automotive detection scenarios.

After determining characteristic scale distribution of image processing tasks, the relevant percentiles have to be determined based on the interfaces of the task-specific decoders 3.1, 3.2, 3.3. For example, if a task-specific decoder connects to the encoder 2 at one layer with specific feature map resolution, the maximal object size should be considered, for example, the 99th percentile. If the task-specific decoder receives input from two, three or four layers, the relevant percentiles might be, for example, selected between the median (50th percentile) and the 99th percentile. For example, if the task-specific decoder connects to the encoder 2 at two different layers, the 50th and 99th percentile may be chosen. If the task-specific decoder connects to the encoder 2 at three different layers, the 50th, 75th and 99th percentile may be chosen. If the task-specific decoder connects to the encoder 2 at four different layers, the 50th, 66th, 82nd and 99th percentile may be chosen etc.

If more than four input layers are defined or there is a need in detecting smaller objects, percentiles smaller than 50th percentile can also be considered.

After calculating characteristic scale distributions and relevant percentiles for all tasks, the next step is to determine possible encoder architectures and corresponding receptive field sizes of encoder layers.

Specifically, in automotive applications, computational resources are very limited. Therefore, technically feasible encoder architectures heavily depend on the specific computational hardware and their restrictions.

The most common restriction is that any feasible encoder architecture must fit a specific runtime budget, i.e., there is a very strict upper limit for the runtime. Typically, if the complexity and/or runtime of a neural network decreases, its performance also decreases. Therefore, when determining the set of possible encoder architectures, it is the goal to find multiple or all feasible encoder structures that use from 90% up to 100% of the predefined runtime limit. In other words, feasible encoder architecture candidates should exhaust the predefined runtime limit as much as possible in order to obtain a high performance of neural network.

The feasible encoder architecture candidates are automatically or semi-automatically constructed by considering the predefined runtime limit by using multiple building blocks. A further restriction for computational hardware, specifically embedded hardware, is the availability of certain neural network layers. Many SoCs (SoC: system on a chip) support only a small subset of layers and the list of available layers varies greatly depending on the specific hardware. Therefore, depending on the specific hardware, a set of building blocks of the encoders is predefined. Depending on the hardware, these building blocks can be extremely simple (e.g., containing only simple convolutional layers, pooling operations and activations) or these building blocks can be more complex, e.g., ResNet or DarkNet blocks or even cells from architecture search methods like DARTS.

After determining the building blocks dependent on the given hardware, these building blocks can be stacked in order to create deeper encoders. Each block has a specific block width (also referred as channel number). Based on the block width, the width of the network can be tuned. The runtime of each building block depends on its width and its input size. As such, the block-specific runtime on the target hardware can be calculated. Thereby, after the building blocks of the encoders are defined, it is possible to automatically or semi-automatically determine a set of architectures that fit within the narrow range of acceptable runtime limits.

It is worth mentioning, that the number of convolutional layers that keep the resolution can be adapted in order to finetune the receptive field size. As the encoders are designed to run on limited computational hardware, specifically embedded hardware, when the number of convolutional layers increase, the number of channels, also referred to as encoder layer width, should be decreased to meet above-mentioned runtime budget. In addition, the branching of the multi-task encoder, is chosen such that the branching point for two tasks should be set to the latest layer because the most resource-efficient encoder solution keeps as many layers shared as possible.

After determining multiple feasible encoder architectures with certain receptive fields in the respective encoder layers, respectively branch-specific receptive fields in the respective encoder layers, the matching quality of the receptive field of the encoder layers of the respective encoder architectures with respect to the determined percentiles of the respective task-specific decoder is assessed.

The assessment of matching of the characteristic scale distributions and the possible receptive fields can be done by searching the encoder architecture which provides the lowest deviations between determined percentiles of task-specific characteristic scale distributions and the receptive field sizes of encoder layers. The encoder architecture with the lowest deviations can be determined by searching the encoder architecture which comprises the minimal value of a loss function. An example of such loss function is a simple mean squared error between the relevant percentiles defined by the task-specific characteristic scale distributions and the receptive field sizes for each architecture candidate.

The loss function can be implemented with different distance measures. For example, a L1 (least absolute deviations) or cosine distance can be used as distance measure.

The loss function can optionally contain a penalty term that increase the loss value if the number of shared layers for an encoder architecture decreases. Thereby, the loss function enforces resource savings by sharing encoder layers between multiple image processing tasks.

In the following, the disclosed method for determining the architecture of an encoder of a convolutional neural network is described based on an example with reference to FIG. 5 to FIG. 11.

FIG. 5 shows multiple characteristic scale values which are associated with two different image processing tasks, namely task t1 and task t2. The tasks show different characteristic scale distributions. As such, the pixel sizes associated with $50^{th}$, $60^{th}$, $80^{th}$ and $99^{th}$ percentile of the respective characteristic scale distributions are different for the tasks t1, t2.

The task-specific decoders configured to process task t1, respectively, task t2 may require four input connections, i.e., each task-specific decoder connects with four different encoder layers of the encoder. The four input connections of each task-specific decoder have different resolutions. The resolutions are indicated by different shading of cells, respectively, columns of the table. As such, each task-specific decoder has to be connected to an encoder layer which provides the required resolution.

FIG. 6 shows example results of encoder architecture search. As mentioned above, the architecture search is performed based on the key issue that any feasible encoder architecture candidate meets the runtime limit requirement, e.g., meets 90% or more of the upper runtime boundary of given hardware in order to obtain high performance of neural network.

Each circle of each encoder architecture represents an encoder layer, wherein the first, left-most circle may represent one or more layers. However, when comparing the shading of the cells in the table of FIG. 5 and the circles of FIG. 6, the first, left-most encoder layer(s) is not needed because the resolution of encoder layer does not match with the required resolutions of task-specific decoder.

The numbers within the circles representing an encoder layer indicates the width of encoder layer. It is worth mentioning that with increasing length of the encoder (i.e. increasing number of encoder layers), the width of the encoder layers has to decrease in order to meet the runtime limit requirement.

Each encoder layer includes a certain receptive field. The receptive field of each encoder layer is indicated by the number arranged below the circle representing the respective encoder layer. The receptive field of an encoder layer increases with the depth of encoder, i.e. an encoder layer arranged in a greater depth comprises a higher receptive field as an encoder layer arranged in a lower depth.

Based on the tables of FIG. 7 to FIG. 10, the method step of calculating assessment measures for evaluating the quality of matching of an encoder architecture to process a certain task is described. More specifically, it is investigated if encoder architecture A or C shown in FIG. 6 fits more to task t1, respectively, task t2 of FIG. 5. For each task, a comparison of characteristic scale distribution, specifically a comparison of determined percentiles of characteristic scale distribution with receptive field values of the encoder layers matching with the required decoder resolution is performed.

For example, in FIG. 5, the first input connection of task-specific decoder comprises a pixel size of characteristic scale of 110. The pixel size of receptive field of the encoder layer, which matches to the resolution of the first input connection of task-specific decoder includes a value of 122. As such, the difference is 12.

In order to determine the matching of encoder architecture A to image processing task t1, in the present example, a mean squared error between the pixel size of characteristic scale of the respective input connection of task-specific decoder and the pixel size of receptive field of the matching encoder layer is calculated.

As shown in FIG. 7, the summed differences of pixel size of characteristic scale of the respective input connection of task-specific decoder and the pixel size of receptive field of the matching encoder layer is 182. The value represents an assessment measure (in the embodiment referred to as sum loss) which can be used for assessing which encoder architecture fits best to the respective task and should therefore be used at least as a task specific branch in the encoder.

FIG. 9 shows the assessment of matching of encoder architecture C according to FIG. 6 to the image processing task t1 according to FIG. 5. When comparing the assessment measures, respectively, sum losses, it can be concluded that encoder architecture A matches better to image processing task t1 than encoder architecture C because the assessment measure, respectively, sum loss is lower.

FIGS. 8 and 10 shows similar assessment of matching of encoder architectures A and C of FIG. 6 to image processing task t2 according to FIG. 5. When comparing the assessment measures, respectively, sum losses, it can be concluded that encoder architecture C matches better to image processing task t2 than encoder architecture A because the assessment measure, respectively, sum loss is lower.

As shown in FIGS. 9 and 10, if multiple encoder layers exist which provides the same resolution which is required by task-specific decoder, it is possible to determine which encoder layer should be connected to the task-specific decoder by comparing the receptive field of each encoder layer with the determined percentile of characteristic scale of the respective task and chose the encoder layer which provides a receptive field that comes closest to the determined percentile.

Figure 11:
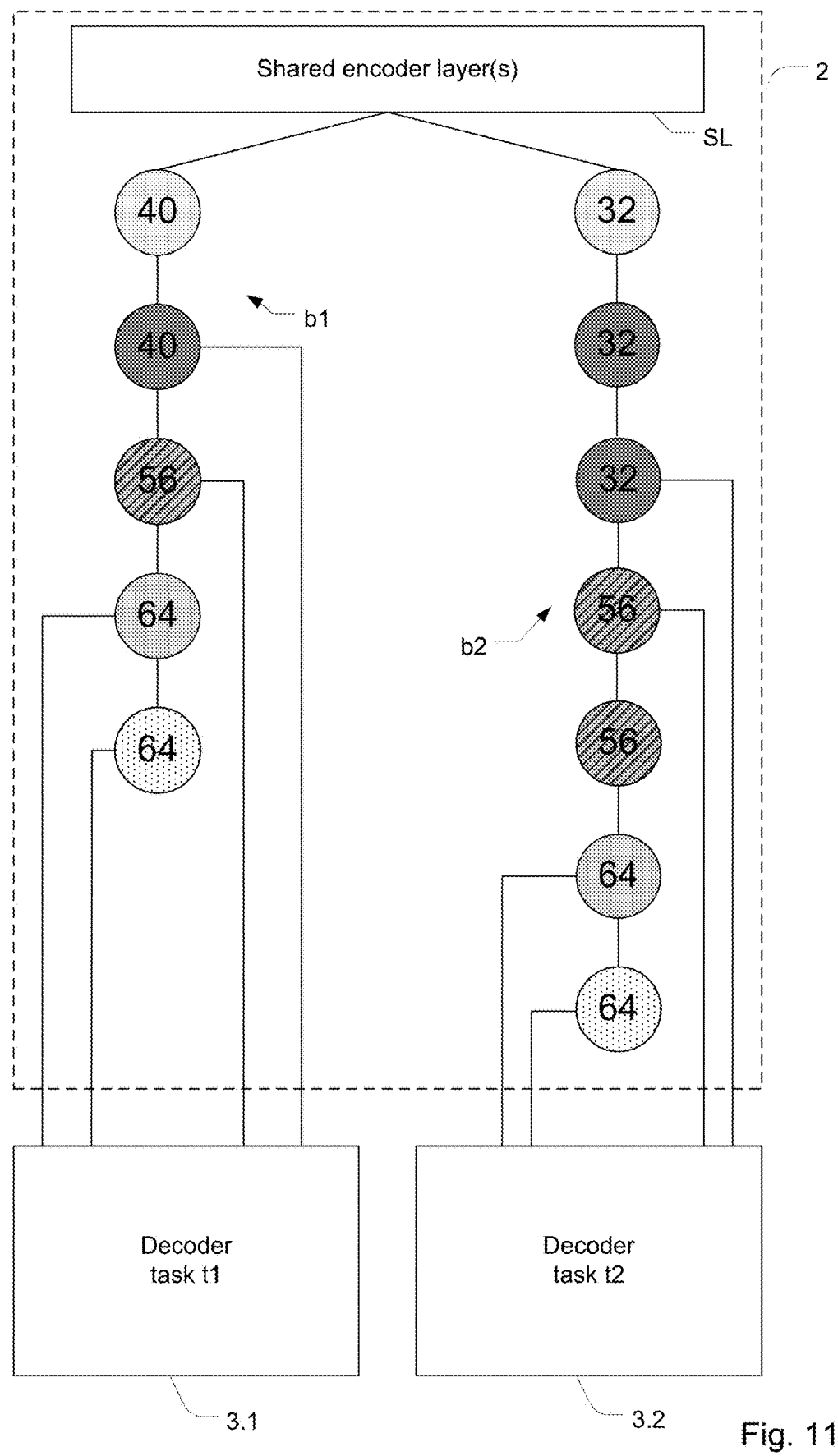
FIG. 11 illustrates the resulting encoder structure of the example according to FIGS. 5 to 10.

FIG. 11 shows the architecture of resulting shared encoder configured to process image processing tasks t1 and t2 according to the results of matching assessment and the coupling of the shared encoder with task specific decoders. The encoder includes one or more shared encoder layers which provides computational operations for both image processing tasks t1, t2 and two branches, wherein each branch provides task-specific computational operations for a certain task. In FIG. 11, left branch is associated with task t1, i.e., one or more encoder layers of the left branch provide information to a task-specific decoder which is configured to image processing tasks t1. Similarly, right branch is associated with task t2, i.e., one or more encoder layers of the right branch provide information to a task-specific decoder which is configured to image processing tasks t2.

Figure 12:
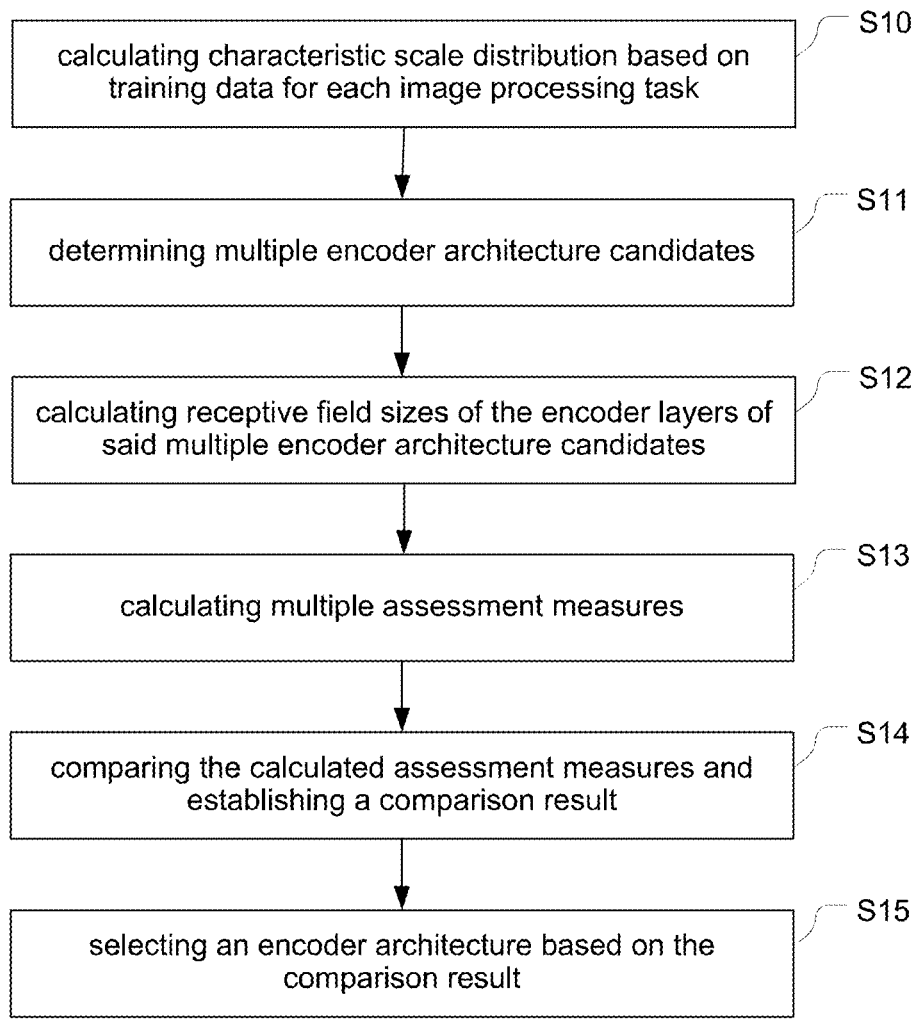
FIG. 12 shows a schematic block diagram illustrating the steps of a method for determining the architecture of a shared encoder of a convolutional neural network.

FIG. 12 shows a flow diagram illustrating the steps of a method for determining the architecture of an encoder of a convolutional neural network.

First, for each image processing task, characteristic scale distribution based on training data is calculated (S10).

In addition, multiple encoder architecture candidates are determined (S11). Each encoder architecture of the encoder architecture candidates includes at least one shared encoder layer which provides computational operations for multiple image processing tasks and multiple branches which span over one or more encoder layers. The branches provide at least partly different computational operations for the image processing tasks. Each branch is associated with a certain image processing task.

After determining feasible encoder architecture candidates, receptive field sizes of the encoder layers of the encoder architectures are calculated (S12).

In addition, multiple assessment measures are calculated (S13). Each assessment measure refers to a combination of a certain encoder architecture of the multiple encoder architectures and a certain image processing task. Each assessment measure includes information regarding the quality of matching of characteristic scale distribution of the image processing task associated with the assessment measure to the receptive field sizes of the encoder layers of the encoder architecture associated with the assessment measure.

As a next step, the calculated assessment measures are compared, and a comparison result is established (S14).

Finally, an encoder architecture is selected based on the comparison result (S15).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 neural network
2 encoder
3.1, 3.2, 3.3 task-specific decoder
b1, b2, b3 branch
L1-L5 encoder layer
t1, t2, t3 image processing task
SL shared encoder layer

The invention claimed is:

1. A method for determining an architecture of an encoder of a convolutional neural network, the neural network being configured to process multiple different image processing tasks, the method comprising:
for each image processing task, calculating a characteristic scale distribution based on training data, the characteristic scale distribution indicating a size distribution of objects to be detected by the respective image processing task;
generating multiple encoder architecture candidates, each encoder architecture of the encoder architecture candidates comprising at least one shared encoder layer which provides computational operations for multiple image processing tasks and multiple branches which span over one or more encoder layers which provide at least partly different computational operations for the image processing tasks, wherein each branch is associated with a certain image processing task;
calculating receptive field sizes of the encoder layers of the multiple encoder architectures;
calculating multiple assessment measures, each assessment measure referring to a combination of a certain encoder architecture of the multiple encoder architectures and a certain image processing task, each assessment measure including information regarding the quality of matching of characteristic scale distribution of the image processing task associated with the assessment measure to the receptive field sizes of the encoder layers of the encoder architecture associated with the assessment measure;
comparing the calculated assessment measures and establishing a comparison result; and
selecting an encoder architecture based on the comparison result.

2. The method according to claim 1, further comprising determining for the characteristic scale distribution of each image processing task, one or more percentiles, values of the one or more percentiles depending on an interface of a task-specific decoder.

3. The method according to claim 2, wherein a number of determined percentiles is chosen according to a number of input connections required by the task-specific decoder.

4. The method according to claim 2, wherein the values of the percentiles are distributed across a percentile range defined by a minimum and a maximum percentile value.

5. The method according to claim 4, wherein the values of the percentiles are equally distributed across the percentile range.

6. The method according to claim 1, wherein at least some of the encoder layers of a task-specific branch of the encoder comprise a feature map with a resolution which matches to a feature resolution of an input connection of a task-specific decoder.

7. The method according to claim 1, wherein generating multiple encoder architecture candidates comprises selecting certain building blocks, which are adapted for an encoder of a neural network, out of a set of building blocks and connecting the selected building blocks in order to obtain an encoder architecture.

8. The method according to claim 1, wherein the encoder architectures of the encoder architecture candidates are determined by defining a runtime limit and the encoder architectures are created such that, at a given hardware, the encoder architectures provide computational results in a runtime range of 90% to 100% of the runtime limit.

9. The method according to claim 1, wherein calculating multiple assessment measures comprises comparing the receptive field size of an encoder layer which matches with a resolution of a task-specific decoder with a determined percentile value and determining a distance between the receptive field size and the percentile value.

10. The method according to claim 1, wherein calculating multiple assessment measures comprises comparing multiple receptive field sizes of encoder layers which match with a resolution of a task-specific decoder with multiple determined percentile values and determining a sum of distances between the receptive field sizes and the percentile values.

11. The method according to claim 1, wherein calculating multiple assessment measures uses a loss function with a least absolute deviations distance measure, the absolute deviations distance measure comprising an L1 distance measure or a cosine distance measure.

12. The method according to claim 1, wherein calculating multiple assessment measures uses a loss function with a penalty term, the penalty term being adapted to increase the assessment measure with a decreasing number of layers shared between multiple image processing tasks of an encoder architecture.

13. The method according to claim 1, wherein comparing the calculated assessment measures and establishing a comparison result comprises determining an encoder architecture for each image processing task which has a lowest assessment measure.

14. The method to claim 1, wherein selecting an encoder architecture based on the comparison result comprises selecting, for each image processing task, the encoder architecture which has a lowest assessment measure.

15. A computer program product for determining the architecture of an encoder of a convolutional neural network, the computer program product comprising a non-transitory computer readable storage medium having program instructions embodied therewith, the program instructions being executable by a processor to cause the processor to execute a method comprising:

for each image processing task, calculating a characteristic scale distribution based on training data, the characteristic scale distribution indicating a size distribution of objects to be detected by the respective image processing task;

generating multiple encoder architecture candidates, each encoder architecture of the encoder architecture candidates comprising at least one shared encoder layer which provides computational operations for multiple image processing tasks and multiple branches which span over one or more encoder layers which provide at least partly different computational operations for the image processing tasks, wherein each branch is associated with a certain image processing task;

calculating receptive field sizes of the encoder layers of the multiple encoder architectures;

calculating multiple assessment measures, each assessment measure referring to a combination of a certain encoder architecture of the multiple encoder architectures and a certain image processing task, each assessment measure including information regarding the quality of matching of characteristic scale distribution of the image processing task associated with the assessment measure to the receptive field sizes of the encoder layers of the encoder architecture associated with the assessment measure;

comparing the calculated assessment measures and establishing a comparison result; and selecting an encoder architecture based on the comparison result.

16. The computer program product according to claim 15, wherein the method executed by the processor further comprises determining, for the characteristic scale distribution of each image processing task, one or more percentiles, values of the one or more percentiles depending on an interface of a task-specific decoder.

* * * * *